United States Patent [19]
Kurstedt, Jr. et al.

[11] 3,754,138
[45] Aug. 21, 1973

[54] INNER LAYER POSITION MEASUREMENT

[75] Inventors: Harold A. Kurstedt, Jr.; Mason L. Thompson, Jr., both of Columbus, Ohio

[73] Assignee: Industrial Nucleonics Corporation, Columbus, Ohio

[22] Filed: Oct. 7, 1971

[21] Appl. No.: 187,413

[52] U.S. Cl. ............ 250/302, 250/51.5, 250/71 R
[51] Int. Cl. ............................................. G01t 1/16
[58] Field of Search ...................... 250/83.3 D, 51.5, 250/71

[56] References Cited
UNITED STATES PATENTS

| | | | |
|---|---|---|---|
| 3,405,267 | 10/1968 | Chope | 250/83.3 D |
| 2,897,371 | 7/1959 | Hasler | 250/83.3 D |
| 3,497,691 | 2/1970 | Chen | 250/51.5 |
| 2,711,480 | 6/1955 | Friedman | 250/51.5 |
| 2,925,497 | 2/1960 | Bessen | 250/51.5 |
| 3,581,087 | 5/1971 | Brinkerhoff | 250/83.3 D |
| 3,617,744 | 11/1971 | Irish | 250/71 |

*Primary Examiner*—James W. Lawrence
*Assistant Examiner*—Harold A. Dixon
*Attorney*—William T. Fryer, III et al.

[57] ABSTRACT

Apparatus and method for measuring the position of a layer disposed within a tire ply, which material contains metallic particles. The inner layer is metal or is coded by providing metallic particles as a tracer material which have a different fluorescence energy from that of the metallic particles present in the tire ply. A source of radiation is directed at the tire ply to cause fluorescence of the layer. Radiation detectors on opposite sides of the tire ply which are sensitive only to the fluorescence energy of the layer, produce signal outputs that are compared to produce a signal which is indicative of the position of the layer within the tire ply.

15 Claims, 5 Drawing Figures

Patented Aug. 21, 1973

INVENTORS
HAROLD A. KURSTEDT, JR.
MASON L. THOMPSON, JR.
BY
William T. Fryer III
ATTORNEY

INNER LAYER POSITION MEASUREMENT

BACKGROUND

This invention relates to coating thickness gauges and more particularly to radiation gauging apparatus and method for determining the position of an inner layer of material within a tire ply of material which has present within it metallic particles.

In the manfuacture of tires it is desirable to apply a coating of one substance on another in order to achieve improved properties of the combined materials which were not available in either material alone. The tire body is built up of rubbersized plies which consist of rubber coated cord fabric. The strength of the tire body is contributed to a significant degree by the cord material whose strands are located in tension. The fabric is usually encased in a layer of rubber forced in between the individual cords of the fabric and above and below the plane of the fabric in order to protect the individual cords from impinging upon each other and causing abrasive wear.

It is of extreme importance that the rubber applied to the cord fabric of the tire ply be coated uniformly to place the cord fabric at a desired position within the protective rubber. If this condition is not achieved, a greater amount of rubber would be applied to one surface than desired or a lesser amount to the other surface and the surface with the lesser amount of rubber would most likely expose the cord to a greater risk of abrasive wear. Moreover, the surface with the excessive rubber thickness could lead to excessive build up of heat in the tire.

In order to insure that the tire cord lies at the desired position, sometimes the center of the protective rubber, at least one method has been applied to measure the position of the tire cord. One of such methods was disclosed by Wilbert E. Chope in U. S. Pat. No. 3,405,267 filed June 17, 1964 and assigned to the assignee of the present invention. The disclosed method achieved the desired cord position by measuring the weight per unit area of the top coating and the bottom coating by means of radiation backscattered from opposite sides of the sheet and computing any differences in the respective weights. By either subtracting or forming the ratio of the respective coating weights, a signal is achieved which is indicative of the relative deviation from the desired condition.

The problem, however, with this approach is that the rubber coatings may contain metallic particles (sometimes called additives) which are suspended usually uniformly, but on occasion non-uniformly, throughout them. These metallic particles are of various chemical compositions and forms, such as the one predominantly used now, zinc oxide, to accelerate the rubber curing process. Since the signals which are compared to indicate the tire cord position depend on backscatter radiation, the metallic particles may produce an anomaly which is not representative of the coating weights alone.

Various forms of energy selection techniques have been used to measure a characteristic of a material. X-ray fluorescent radiation has been used to measure weight of a metal coating, or a coating with a metal filler component that responds to the radiation to fluoresce. (U.S. Pat. No. 2,926,257, H. Friedman, issued Feb. 23, 1960). The metal coating on a base metal has been measured by producing fluorescent radiation from the base and measuring the fluorescent radiation at the coating surface (U.S. Pat. No. 2,521,772, H.F. Beeghly, issued Sept. 12, 1950). Beta-ray scattering has been proposed to measure the location of a stamp on an envelope, by coding the stamp with a beta radiation scattering metal and detecting the backscatter radiation (U.S. Pat. No. 3,143,649, T. E. Mitchell et al., issued Aug. 4, 1964). The measurement of thin wall hollow objects has been enhanced by placing a different atomic number material within it, to improve the backscatter radiation intensity. (U.S. Pat. No. 3,943,202, P. Kramer, issued June 28, 1960).

The prior art, to our knowledge, has not developed a method or apparatus using fluorescent radiation techniques suitable for determining the position of an inner layer of material within a tire ply.

It is thus an object of the present invention to provide apparatus and method for determining the position of an inner layer coated with a material containing metallic particles, to form a tire ply.

It is another object of the present invention to provide a measuring system for determining the position of cord fabric between two surface layers of material in tire ply.

It is yet another object of the present invention to provide a measuring system that is insensitive to the metallic particles within the material surrounding the cord in tire ply.

These and other objects of the invention will be evidenced from the description hereinafter presented.

SUMMARY OF THE INVENTION

The invention provides appparatus and method of determining the position of an inner layer in a tire ply. The material forms a tire ply and the inner layer is a strenghthening member for the tire ply. The material body contains metallic particles due to commercial requirements. The manufacture of rubber tires would present the situation of a rubber tire ply, with zinc oxide particles suspended within the rubber material, having an inner layer such as cords displaced within the rubber ply such that internal strength and support is added to the ply.

The tire cords are coded with metallic particles, preferably of iron oxide or another material of sufficient distinguishable fluorescence energy from that of the zinc oxide. If the cords are themsleves of such material, the metallic coding need not be applied.

An X-ray radiation source is positioned on one side of the rubber coated tire cords. The X-ray beam is directed through the material adjacent one side of the cords. The X-ray radiation is of sufficiently high intensity to cause fluorescence of the metallic coding of the cords. Certain radiation energies would also fluoresce the zinc oxide particles, and it is desirable to filter out the zinc fluorescence energy and have associated radiation detectors which are sensitive only to the fluorescence energy of the metallic coding. The source is aligned such that detectors placed on each side of the tire ply detect the respective fluorescence radiation emanating from the cords. Each of the radiation detectors produce a signal representative of the weight per unit area of the rubber coating the tire cords, the amount of metallic coating on the cords, and the distance between the cords. By comparing the respective signals, an indication is obtained for the position of the cords within the tire ply.

These and other features which are considered to be characteristic of this invention are set forth with particularity in the appended claims. The invention itself, however, as well as additional objects and advantages thereof, will best be understood from the following description when considered in conjunction with the accompanying drawings.

BRIEF DESCRIPTION OF THE DRAWINGS

FIG. 3 including

DESCRIPTION OF THE PREFERRED EMBODIMENT

Figure 1:
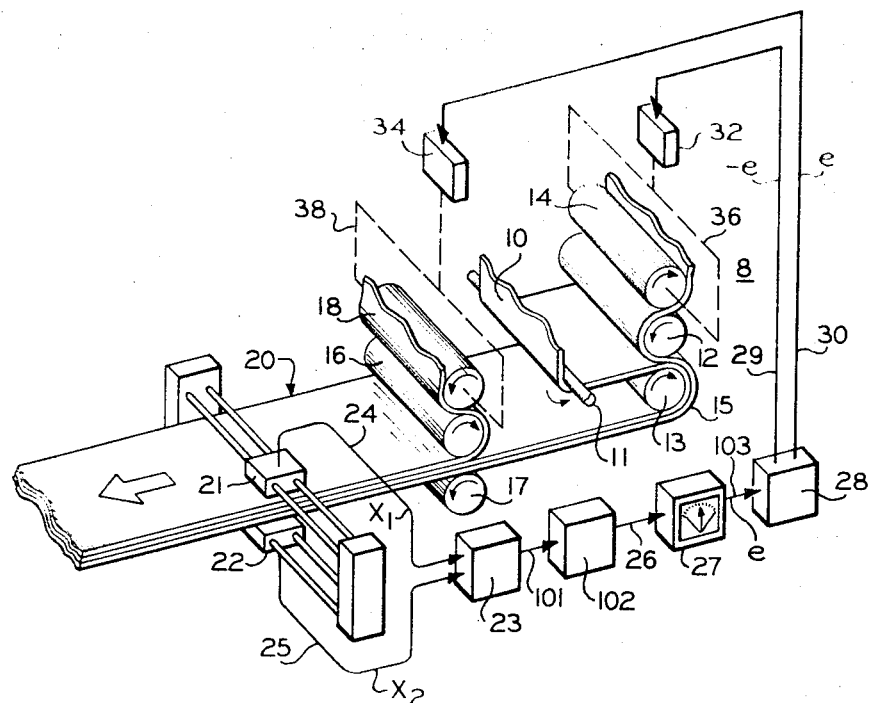
FIG. 1 is a perspective view of a tire ply manufacturing process measured for cord position by fluorescence gauges in accordance with the present invention.

In FIG. 1 is shown a typical two calender train 8 for making calendered fabric for use in the manufacture of vehicle tires. It should be recognized that the invention can be applied to other forms of calenders. A layer of fabric 10, formed of cords or other suitable material, such as a sheet material is fed in the direction of the arrows around a guide roll 11 to and between a central roll 12 and a lower roll 13 of a first roll stand. Gum rubber or the like is distributed on an upper roll 14 of the stand and transferred to one side of the fabric strip 10 by the central roll 12 to form a rubber layer 15. The partially coated sheet is trained around the lower roll 13 and fed to and between a center roll 16 and a lower roll 17 of a second roll stand where another rubber layer 18 is applied in a similar manner. The resulting coated fabric or tire ply 20 emerges in the direction of the large arrow for further processing.

The rubber applied to the layer of fabric 10 has suspended throughout it zinc oxide, referred to herein for convenience as zinc particles which were added to the rubber to produce ideal rubber characteristics for the manufactured tire, e.g., wear, durability, internal strength, and control of the temperature gradient in the tire body.

The fabric 10 is of nlyon or other suitable material and is pre-calender treated before entering the calender train. The fabric is dipped in a chemical solution of resorcinol, formaldehyde, and latex, known in the industry as RFL dip, so that the treated fabric has a dip content equal to approximately 3-8 percent of the treated fabric weight. This chemical treatment provides an adhesive coating to the cords for subsequent bonding with the rubber. A metallic tracer element is added to the dip in order to later provide for a measurement of the location of the fabric 10 when it is combined with the rubber. Other chemicals can be used, depending on the inner layer material and the reaction desired.

The coated fabric 20 is transported between a pair of fluorescence gauges 21 and 22 which are mounted in vertical alignment adjacent to the opposite surfaces of the fabric 20. The weight per unit area of rubber coating on either side of the fabric 10 is measured by directing a beam of radiation onto one of the surfaces of the fabric 20 such as to cause fluorescence of the metallic tracer in the fabric 10. K edge absorption is used here, but other absorption edges such as L-edge absorption can be used, depending on the materials.

One of the gauges 21 and 22 then includes a source of X-radiation directed toward the tire ply 20 and each of them includes a detector positioned to receive the fluorescence radiation emanating from the tire ply 20. Alternatively, each of the gauges could include a source of X-radiation. The use of only one source, however, eliminates a problem of fluorescence radiation on each side of the fabric 10 with components due to each of the sources in the case of the alternative embodiment. The use of two sources is practical, with certain modifications, such as spacing the sources and proper angular position and collimation of the sources and detectors. The amount of radiation fluoresced is attenuated in proportion to the weight per unit area of the rubber material through which it is transmitted. Signals $X_1$ and $X_2$ indicative of the weight per unit area of the rubber coatings are thus developed by the respective detectors and are transmitted by lines 24 and 25 to a ratio computer 23. The ratio computer 23 provides a signal $X_1/X_2$ on line 101 to a comparator 102 that produces an output signal e only when $X_1$ and $X_2$ are not identical in magnitude. Signal e has a polarity dependent on which signal, $X_1$ or $X_2$, is larger and a magnitude proportional to the ratio. Alternatively, the comparison can be by a difference computer, such as one that approximates a ratio. Signal e is coupled to an indicator 27 by line 26, that is calibrated in units of distance of the cords from the balanced, center position in tire ply 20. Signal e is coupled over line 103 to a control unit 28, to produce a predetermined control action (described later).

Figure 2:
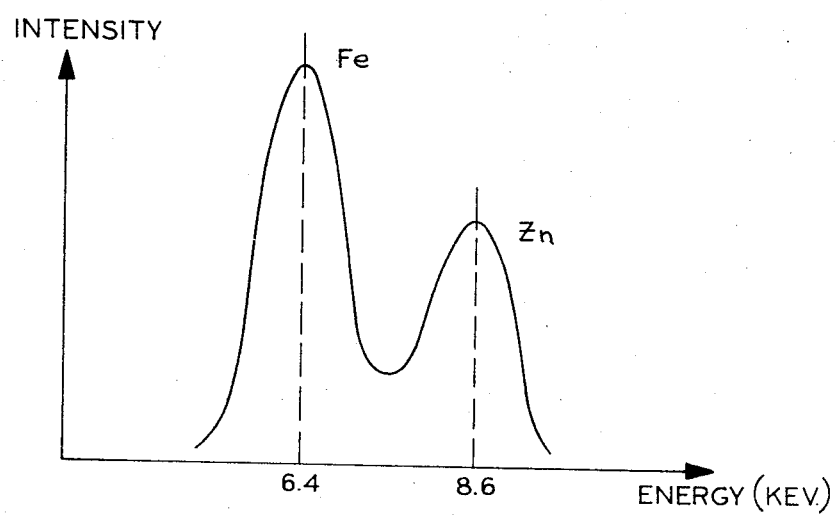
FIG. 2 is a graph illustrating the fluorescence energies between the zinc particles suspended in the tire ply rubber and the metallic coding of the tire cords.
Figure 3A:
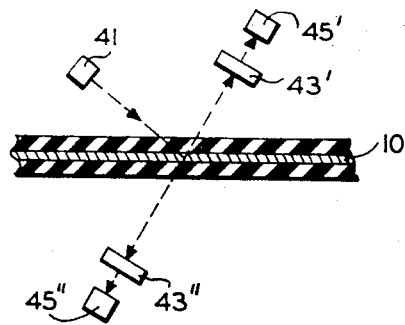
FIGS. 3A and 3B is a diagram of the radiation detectors in combination with their respective filtering means.

The fluorescence energies of the zinc within the rubber and the iron as the tracer material are shown in FIG. 2 to be 8.6 and 6.4 KEV, respectively. Since these fluorescence energies are fairly close to one another, and are usually generated together by an X-ray tube, or other X-ray source, X-radiation inpinging upon the fabric 20 witn an energy at or above the K absorption edge of the zinc will be sufficient to cause flourescence of the iron and zinc. In order to measure the position of the fabric 10 between the rubber coatings, signals $X_1$ and $X_2$ must be developed which are respectively proportional to the weight per unit area of rubber on the top of the fabric 10 and proportional to the weight per unit area of the rubber on the under side of the fabric 10. To achieve such a dependence of signals it is preferable to provide filters 43 or 430 between the X-ray source 41 and the detectors 45, as shown in FIG. 3. FIG. 3 shows two embodiments of filter usage. FIG. 3a is the preferred embodiment with filters 43 displaced between the fabric 10 and the detectors 45, with the fluorescence radiation passing therethrough. The filters 43 are preferably of metal which is selected according to its ratio of attenuation coefficients above and below the K-absorption edge of the filter material. References which would provide the proper filter selection are "GAMMA-Ray Attenuation Coefficients" by Peter F. Berry, Nucleonics Handbook of Nuclear Research and Technology, McGraw Hill, page 209, and "X-ray Critical-Absorption and Emission Energies in KEV" by S. Fine and C. F. Hendee, Nucleonics Handbook of Nuclear Research and Technology, McGraw Hill, page 180. Accordingly, with an iron tracer element and zinc particles suspended within the rubber, a proper filter 43 would be of nickle.

Figure 3B:
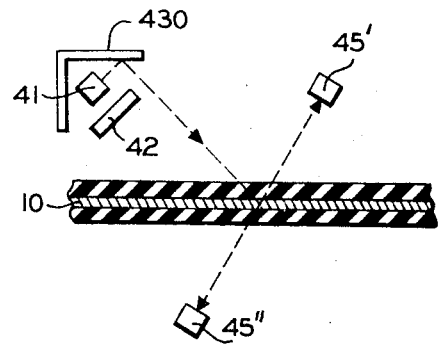

FIG. 3b shows another filter configuration. A lead shield 42 is disposed between the coated fabric 20 and the X-ray source while a V-shaped sheet 430 of filter material is placed in back of the X-ray source 41. A suitable filter sheet 430 would be made of copper. X-radiation would be backscattered from the surface of the filter sheet 430 onto the surface of the coated fabric 20. The backscatter radiation would only be sufficient to fluoresce the iron tracer material and not the zinc particles located within the rubber. Thus another way is provided to insure the transmission of only the iron fluorescence energy to the detectors 45.

Still another form of energy discrimination could be provided by first detecting the combined fluorescence energies of zinc and iron and then processing the output signals from the detectors 45 by a scintillator or proportional tube, which would have a response proportional to an energy (wavelength). Selection, thereby, could easily be made and a signal obtained proportional to the radiation intensity at the selected wavelength range. In this manner, the significant fluorescence energy of the inner layer can be selected predominantly and all other radiation energies can be discriminated against.

Metallic tracers other than iron would certainly be suitable for practicing the invention. The requirements for a suitable tracer elements is that it have a sufficient fluorescence energy for detection by an energy detector and that it be possible to discriminate between the flourescence energy of the tracer element and the fluorescence energy of the zinc within the rubber. If iron were the tracer element to be used, it could be added to the chemical dip in the form of $Fe(OH)_2$, $FeO$, or $Fe_2O_3$. The concentration of iron added to the dip has varied from 6.8 percentage by weight of the dip to 24.89 percentage by weight of the dip weight. An intermediate percentage weight of iron used was 12.4 percent. The fluorescence intensity of the iron was greater with increasing concentrations of iron; and as a result, it was easier to discriminate the iron fluorescence energy from that of zinc with increasing concentrations of iron as the tracer element. Other suitable tracer elements would be those having an atomic weight of approximately 20 to 50. An especially suitable metallic element would be molybdenum having an atomic weight of 42. It is preferable that the tracer element be mixed with the chemical dip in an inert chemical form so that there be no undesirable chemical reactions with the dip.

Figure 4:
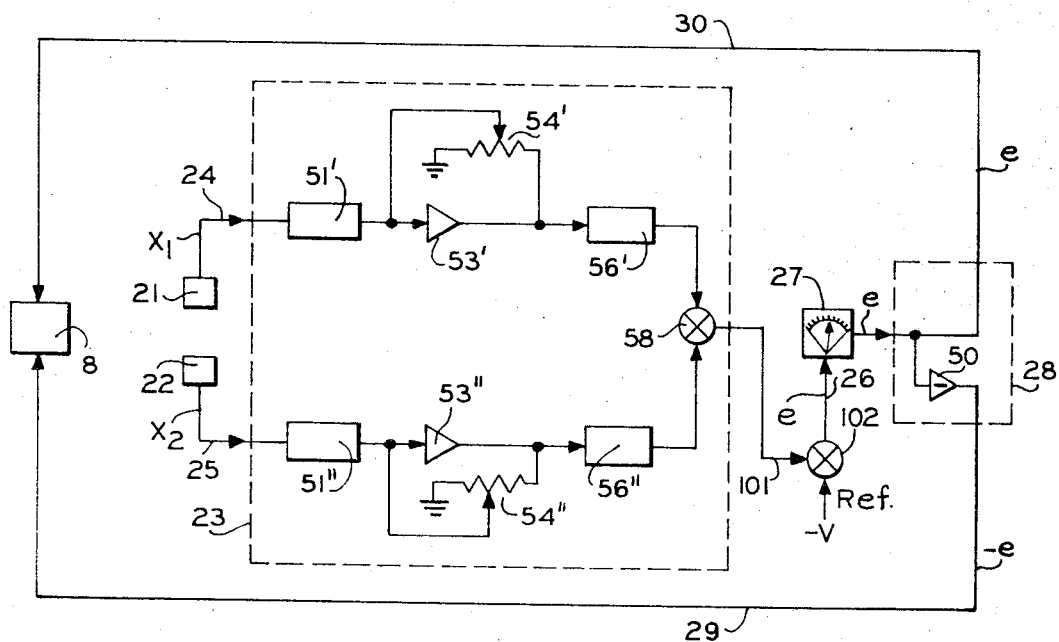
FIG. 4 is a schematic diagram of the balance coat measurement system shown in greater detail including additional features of the present invention.

By filtering out the zinc fluorescence radiation by one of the above methods, signals $X_1$ and $X_2$ may be provided which respectively are proportional to the weight per unit area of the rubber on top of the fabric 10 and the weight per unit area of rubber on the underside of the fabric 10. Such signals would be carried by means of lines 24 and 25, respectively, to the input terminals of the ratio computer 23. As shown in FIGS. 1 and 4, the ratio computer 23 provides, then, a signal $X_1/X_2$ which would represent the balance or imbalance condition with respect to the weight per unit area of the rubber above and below the fabric 10. This signal is transferred to a comparator 102, to develop signal $e$ coupled to control unit 28 which would generate output signals such as $e$ and $-e$ to be carried by lines 30 and 29, respectively, to corresponding solenoids 32 and 34. Such output signals, depending upon the signal transferred to control unit 28 representing the off center position, would cause the solenoids 32 and 34 to activate the positioning elements 36 and 38 of the calender stands such that the center position is resumed.

If the signal transferred to control unit 28 has a negative sign, for example being representative of an excessive rubber weight per unit area above the fabric 10, the output signals from control unit 28 would be of opposite polarity from each other in accordance with the requirement that the upper roll 18 would be lowered to decrease the weight per unit area above the fabric 10 and the upper roll 14 would be raised to increase the weight per unit area below the fabric 10. Such distributive positioning of the rolls 18 and 14 would insure that the total thickness of the coated fabric 20 would remain substantially constant. Conversely, if the signal transferred to control unit 28 is of positive sign, representing the other imbalance condition, the signals generated from control unit 28 would be of the reverse polarity.

As shown in FIG. 4, the control unit 28 consists of an inverter 50 connected by line 29 in parallel with line 30. The signal $e$ from indicator 27 is applied directly to line 30, while it is inverted to the signal $-e$ which is carried by line 29 to the solenoid 32. Thus, signals are provided on lines 29 and 30 which are of the same amplitude and of opposite polarity from each other.

The ratio computer 23 is shown in FIG. 4 as part of a schematic diagram of the balance coat measurement system. The computer 23 consists of a parallel arrangement of electrometers 51 connected in series with amplifiers 53, having an adjustable gain, and in series with linearizing circuits 56 with each of the series branches connecting to the difference or ratio circuit 58. The input signal to the electrometer 51 would be that generated from one of the gauges 21 and 22. The electrometer 51 would amplify the signal by means of a high meg resistance to a useable signal which is transferred to an input terminal of the amplifier 53. The amplifier 53 has a variable resistor 54 connected in parallel across its input and output terminals so as to provide the adjustable gain feature. The output signal of the amplifier 53 is transferred to the linearizer 56 so that the inherently analog signal is transferred to the ratio circuit 58 in linear form. The respective processed signals $X_1$ and $X_2$ which originated from the gauges 21 and 22 are compared by the ratio circuit 58 which generates an output signal indicative of their comparison, or in other terms, the balance of imbalance condition of the upper and lower rubber coatings which they represent. The output signal from the ratio circuit 58 is transferred to the comparator 102, that has an input signal $-v$ that acts as a reference, in the preferred form equal to 1. When $X_1$ and $X_2$ are equal, their ratio is 1, and comparator 102 adds $X_1/X_2$ and $-v$, and produces no output signal on line 26. If $X_1$ is larger than $X_2$, an error signal $e$ is produced, and when $X_2$ is smaller than $X_1$, an error signal $-e$ is produced and coupled to indicator 27 and control unit 28. The matching arrangement of the signal polarities and the particular control for the calender rolls can take several forms, to carry out the previously described cord positioning function.

The use of amplifiers 53 having an adjustable gain allows for the calibration of the system with known samples such that the signal indicative of the balance or imbalance condition is directly proportional to the position of the cords within the thickness of the tire body and indicator 27 is calibrated to indicate the cord position.

Obviously, many modifications of the present invention are possible in light of the above teaching. For example, control systems using other gauges on the process may be combined with the cord position system to maintain a desired relationship for top and bottom layer thickness as well as cord position, either along the sheet length or across its width; the cord position gauges can be scanned and a cord profile position adjustment can be made to the calender; suitable adjustment can be made to position the fabric other than in the middle between the coating layers; the information supplied by indicator 27 can be used to control the cord position by manual adjustment of the calender; other electronic and mechanical apparatus can be used to carry out the described or equivalent functions. It is therefore to be understood that, in the scope of the appended claims, the invention may be practical otherwise than as specifically described.

What is claimed is:

1. Apparatus for measuring the location of an inner layer within a tire ply of coating material containing a suspension of metallic particles, said layer contributing to the internal strength of said ply and being of metal or coded with metallic tracer which has a fluorescence energy different from the fluorescence energy of said metallic particles, said apparatus comprising:
   means for directing radiation into said tire ply, said radiation being of sufficient intensity to cause fluorescence of said inner layer, and
   means responsive to the fluorescence energy of said inner layer emerging from opposite sides of said ply for producing an output signal proportional to the position of said inner layer in said tire ply.

2. Apparatus as defined in claim 1 including filtering means for discriminating between the fluorescence energy of said inner layer and the fluorescence energy of said metallic particles.

3. Apparatus as defined in claim 1, wherein said radiation means has an energy band that includes the fluorescence energy of said metallic particles and said inner layer, and comprising filter means disposed between said tire ply and said signal producing means to discriminate against the fluorescence radiation from said metallic particles and pass on the fluorescence radiation from said inner layer to said signal producing means.

4. Apparatus as defined in claim 1, wherein said radiation means has an energy band that includes the fluorescent energy of said metallic particles and said inner layer, and comprising filter means disposed between said tire ply and said radiation directing means to pass on to said material the radiation the fluoresces said inner layer and does not fluoresce said metallic particles.

5. Apparatus as defined in claim 1, including filter means in said signal producing means for causing said output signal to respond primarily only to the fluorescent radiation from said inner layer.

6. Apparatus as defined in claim 1 wherein said directing means includes at least one radiation source means, which directs a beam of radiation onto said inner layer, and said signal producing means produces separate signals corresponding to the radiation fluoresced from each of the opposite sides of said inner layer.

7. Apparatus as defined in claim 6 wherein there is further included means for comparing said signals to obtain a calibrated indication of the position of said inner layer.

8. In a system for controlling a tire calender process involving the positioning of an inner layer within a tire ply which contains a suspension of metallic particles, said inner layer contributing to the internal strength of said tire ply and being of metal or coded with a metallic tracer which has a fluorescence energy different from the fluorescence energy of said metallic particles, an inner layer position measuring apparatus comprising:
   means for directing radiation into said tire ply onto said inner layer, said radiation being of sufficient intensity to cause fluorescence of the said inner layer;
   means responsive to the fluorescence energy of said inner layer emerging from opposite sides of said body for producing an output signal proportional to the position of said inner layer in said tire ply.

9. The system of claim 8, including calender means for coating said inner layer on both sides, means responsive to said position signal and coupled to said calender means for producing a signal which controls said calendering means to position said inner layer in a predetermined location within said tire ply.

10. The system as defined in claim 8 wherein said control signal producing means is responsive to a comparison of the radiation fluoresced from the respective sides of said inner layer producing at least one signal which controls said calendering means such that said inner layer is positioned in a predetermined location within said tire ply.

11. In a process for the manufacture of vehicle tire plies with an inner layer for internal support wherein said inner layer is coated with a material that contains metallic particles, the method of measuring the inner layer position comprising the steps of coding the inner layer with a metallic tracer material, combining said inner layer with said coating material to form a tire ply, irradiating said tire ply with radiation means that fluoresces said metallic tracer material, and measuring the position of said coded inner layer within said tire ply by means responsive to the fluorescence energy of the metallic tracer material emerging from opposite sides of said tire ply.

12. The method as defined in claim 11 wherein said tracer material has a different fluorescence energy from that of said metallic particles, and said measuring step includes discriminating between the fluorescence energy of said tracer material and the fluorescence energy of said metallic particles, to measure predominantly the fluorescence energy of said tracer material.

13. The method as defined in claim 11 wherein said measuring step includes comparison of the signals representative of fluoresced radiation from said tracer material emerging from one side of said tire ply and a signal representative of the fluoresced radiation from said tracer material emerging from the other side of said tire ply.

14. The process of manufacturing a vehicle tire ply with an inner layer of metal or coded with a metallic tracer, said inner layer being for material support and coated with a material containing metallic particles to form said tire ply, the tire ply being produced on calender means, comprising the steps of during manufacture, irradiating said tire ply by radiation means to fluoresce said inner layer, measuring the inner layer fluoresced radiation emerging from opposite sides of said tire ply to provide an indication of the position of said inner layer in said tire ply.

15. The process of claim 14, wherein said calender means is controlled in response to said measurement to maintain said inner layer at a predetermined position in said tire ply.

* * * * *